United States Patent

[11] 3,587,479

[72] Inventor Robert C. Geschwender
1800 Center Park Road, Lincoln, Nebr. 68512
[21] Appl. No. 671,864
[22] Filed Sept. 29, 1967
[45] Patented June 28, 1971

[54] CELLULAR STRUCTURAL PRODUCTS
13 Claims, 11 Drawing Figs.

[52] U.S. Cl. .................................................. 108/51
[51] Int. Cl. .................................................. B65d 19/18
[50] Field of Search.......................................... 108/51-
—58; 264/45, 46; 161/107

[56] References Cited
UNITED STATES PATENTS

| | | | |
|---|---|---|---|
| 2,656,291 | 10/1953 | Doll et al. ..................... | 161/107 |
| 2,862,650 | 12/1958 | Scott et al. ..................... | 161/107 |
| 2,911,274 | 11/1959 | Grube .......................... | 108/51UX |
| 2,980,570 | 4/1961 | Cook et al. ..................... | 161/107 |
| 3,153,245 | 10/1964 | Silverman...................... | 161/107 |
| 3,380,403 | 4/1968 | Sullivan........................ | 108/51 |
| 3,435,784 | 4/1969 | Petersen....................... | 108/51 |
| 3,124,627 | 3/1964 | Hood........................... | 264/45 |
| 3,176,055 | 3/1965 | Loos............................ | 264/45 |
| 3,187,069 | 6/1965 | Pincus et al.................... | 264/45 |
| 2,559,930 | 7/1951 | Boltun et al. .................. | 108/57 |
| 3,079,876 | 3/1963 | Doane........................ | 108/56 |
| 3,104,085 | 9/1963 | Skladany...................... | 108/51X |
| 3,159,115 | 12/1964 | Nolan.......................... | 108/51 |
| 3,275,131 | 9/1966 | Erickson ....................... | 108/51X |
| 3,302,593 | 2/1967 | Roberts........................ | 108/56 |
| 2,770,406 | 11/1956 | Lane ........................... | 108/51UX |

*Primary Examiner*—Francis K. Zugel
*Assistant Examiner*—Glenn O. Finch
*Attorney*—Koenig, Senniger, Powers and Leavitt ABSTRACT: A cellular plank is made by continuously pulling a band of cellular material from a supply of the material. As the band is pulled, adhesive is applied to its upper, lower and sidewise faces. It is then directed into a folder which also receives a strip of wrapping material from a supply. Before the wrapping material enters the folder, it is scored along lines which will register with the four corners of the cellular band. The width of the scored strip is equal to the perimeter of an orthogonal cross section of said band. Then as the band and the wrapper pass through the folder, the latter is wrapped about the former so as to be adhered to it by means of the adhesive. After the combined material leaves the folder and the adhesive has set, it is in the form of a wrapped plank which is then cut into appropriate lengths for structural use. A preferred form is that of a block. In some cases several strips are employed for wrapping the blocks but in any event the wrapper covers the top, bottom and two sides of the block leaving the end faces open. The preferred form of cellular material is of the honeycomb type, although it is contemplated that a polyurethane or other like foam material may also be employed.

PATENTED JUN28 1971

Robert L. Geschwender,
Inventor.
Koenig, Senniger,
Powers and Leavitt,
Attorneys.

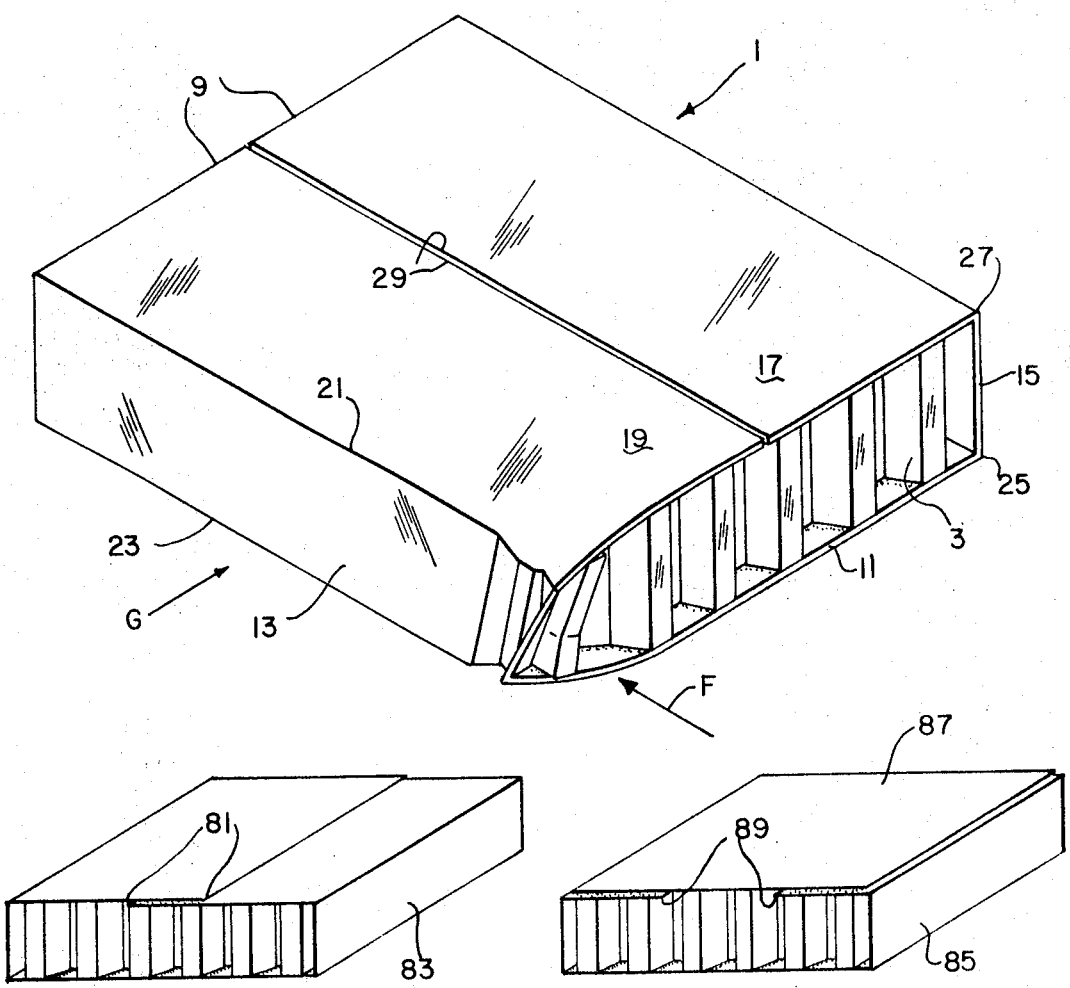
FIG. 3.
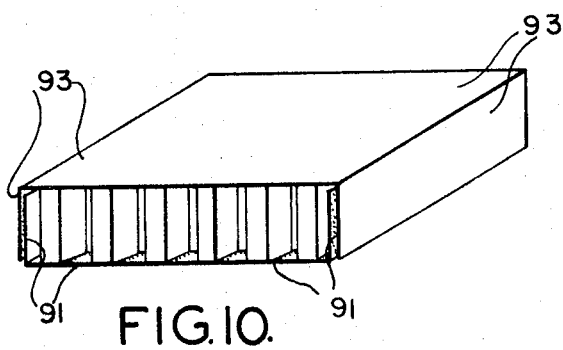
FIG. 8.
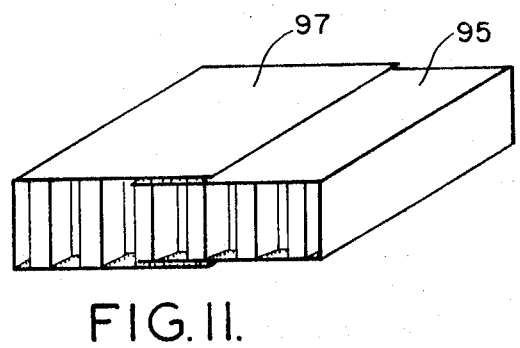
FIG. 9.
FIG. 10.
FIG. 11.

CELLULAR STRUCTURAL PRODUCTS

BACKGROUND OF THE INVENTION

The field of art to which the invention pertains is the manufacture of cellular structural forms for general use and particularly in the production of pallets. Heretofore cellular slabs of stretched cellular honeycomb material have been produced by providing individual upper and lower skins thereon to maintain the desired stretched conformation. The absence of any integral skin connecting the upper and lower skins on the sides of a block caused weakness in the cellular material in shearing between its upper and lower surfaces, as is expected to occur in supports of pallet boards.

SUMMARY

The invention in general provides for rapid low-cost manufacture of stronger, lightweight structural products and more particularly to blocks for supporting purposes, and to improved load supporting pallets employing such supporting blocks, the pallets being adapted to be moved about by means of lift forks.

BRIEF DESCRIPTION OF THE DRAWINGS

FIG. 3 is a view similar to FIG. 1 illustrating how a crushing force operating at a vulnerable corner of the block is prevented from catastrophically shearing the block;

FIGS. 8—11 are diagrammatic views illustrating alternative wrapper forms.

Corresponding reference characters indicate corresponding parts throughout the several views of the drawings. Because of the various thin sections of material used, the drawings are not to scale throughout.

DESCRIPTION OF THE PREFERRED EMBODIMENTS

Figure 1:
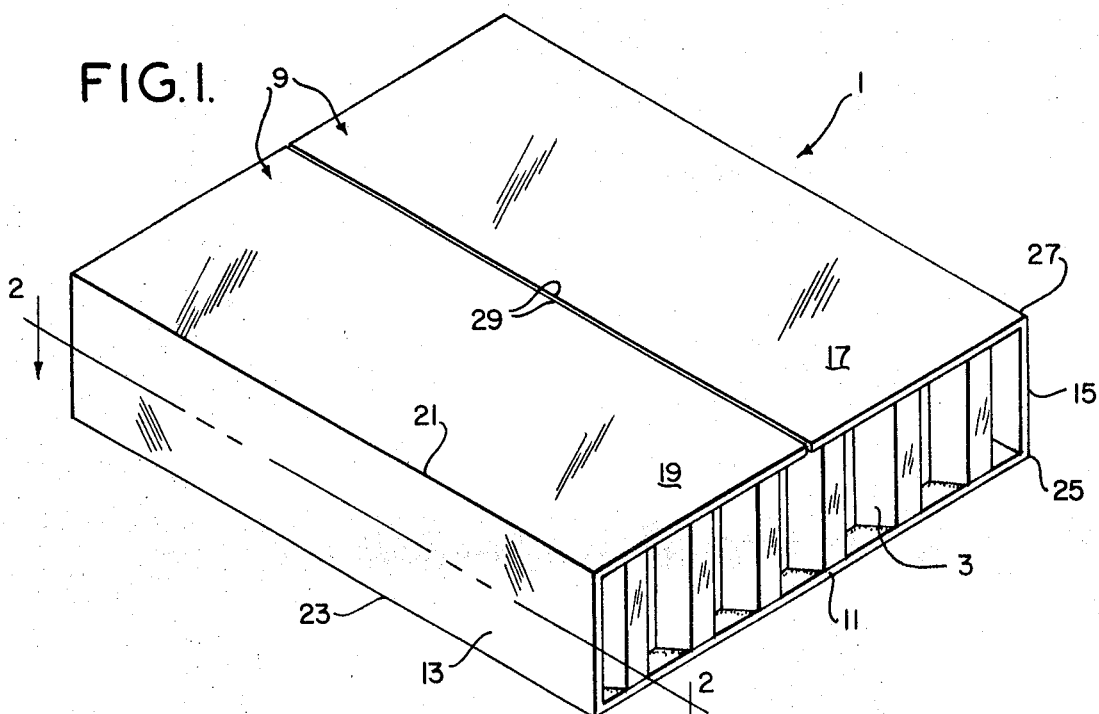
FIG. 1 is a trimetric view of a honeycomb type of block made according to the invention.
Figure 2:
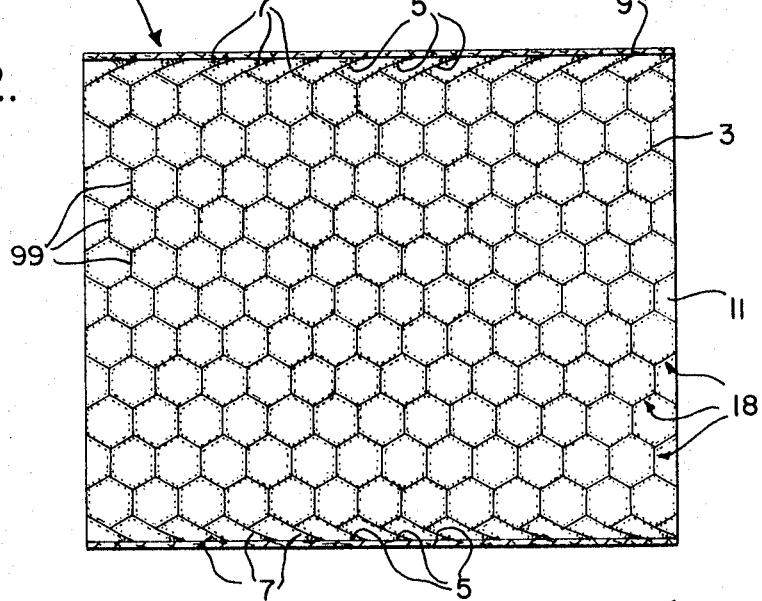
FIG. 2 is a horizontal section as indicated by line 2-2 on FIG. 1.
Figure 4:
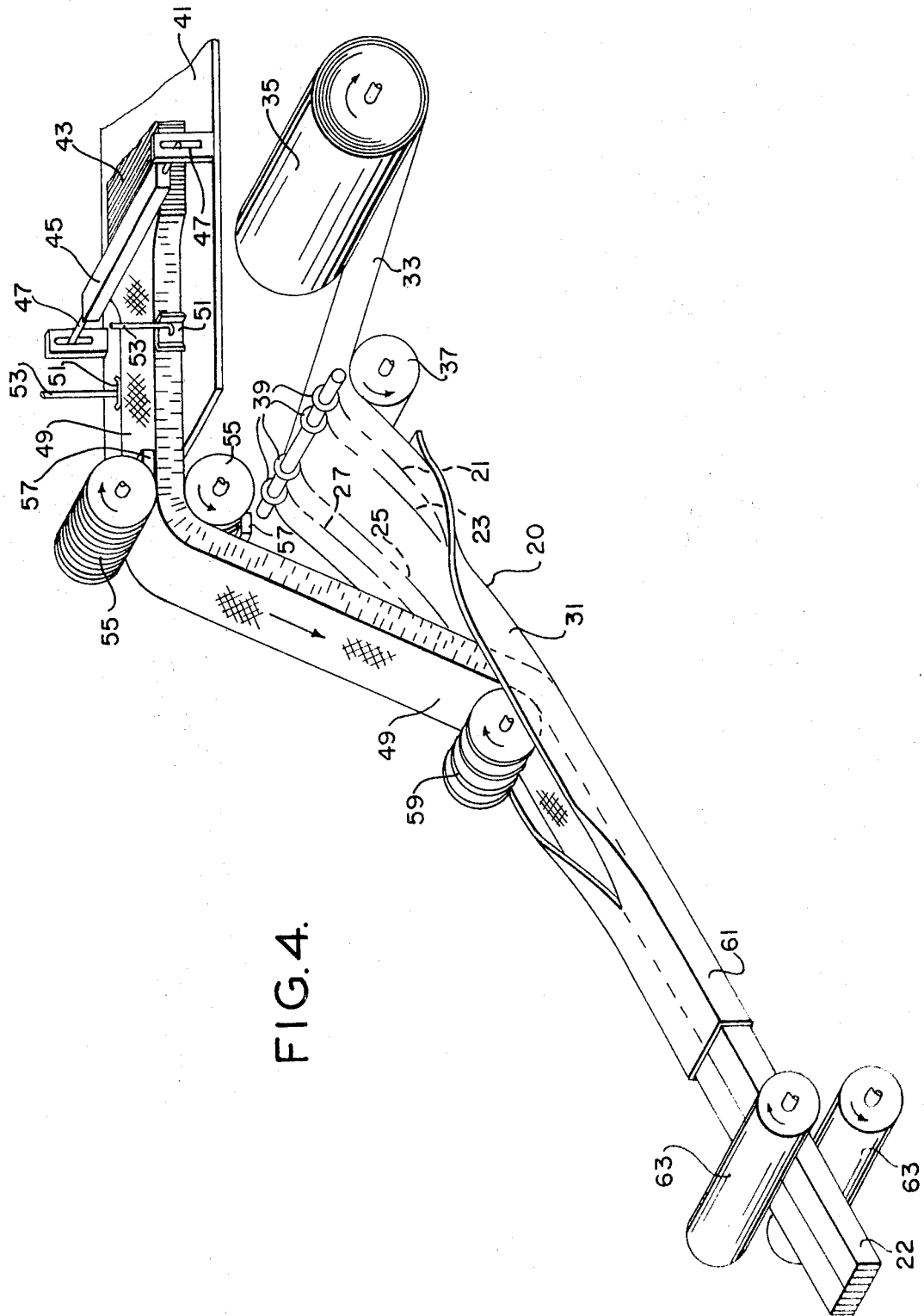
FIG. 4 is a diagrammatic view illustrating my method of manufacturing a plank from which blocks such as shown in FIGS. 1—3 are made.
Figure 5:
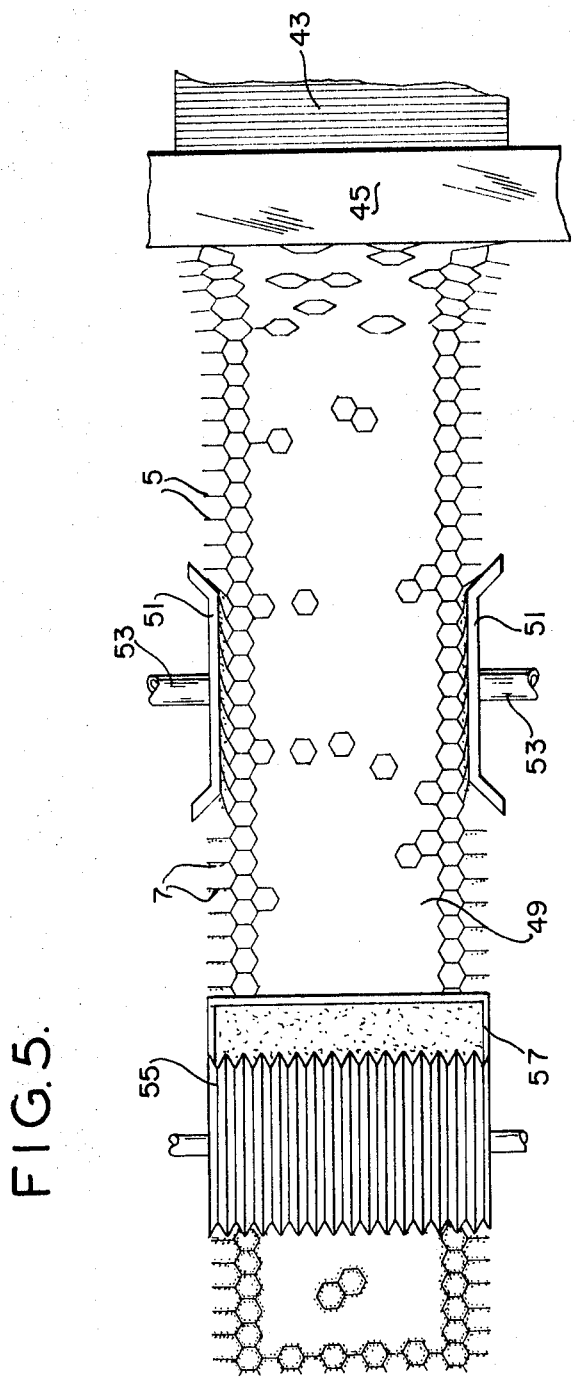
FIG. 5 is a detail plan view of portions of FIG. 4.

Referring now more particularly to FIGS. 1 and 2 of the drawings, there is shown a prismatic block 1 made according to the invention. This employs a honeycomb core 3 which has been stretched from a compaction of the same (FIG. 4). The honeycomb core may be formed from any suitable sheet material such as kraft paper, thin metal foil or the like. One example of how such material is made into honeycomb form appears in my U.S. Pat. No. 3,218,217. Such honeycomb material includes fins such as shown at 5 (FIGS. 2 and 5). These by means described below are provided with adhesive 7 and angled inwardly as shown in FIG. 2. A kraft paper or other web material wrapper is illustrated at numeral 9 which consists of panels 11, 13, 15, 17 and 19 folded along score lines 21, 23, 25 and 27. The margins 29 of wrapper 9 abut one another. The interior surfaces of the panels 13 and 15 are adhered to said fins 5 by the adhesive 7. The interiors of the panels 11, 17 and 19 are attached by adhesive 18 to the upper and lower hexagonal edges of the honeycombs 3.

An advantage of the wrapped construction shown in FIGS. 1 and 2 is illustrated in FIGS. 3 wherein a shearing and cornering force F is being applied to the prism constituted by the block. Such a force or a similar one would without the side panels 13 and 15 provided by the wrapper 9 successively and more or less break down one after another of the succeeding ranks of the honeycomb cells. As illustrated in FIG. 3 this does not occur in the structure made according to the invention. The sidewise panels 13 and 15, forming an integral part of the wrapper, act as strengthening webs between the lower panel 11 on the one hand, and the upper panels 17 and 19 on the other hand. The strengthening effects of the side panels is enhanced by the adhesive attachment thereto of the turned-in ribs 5. If the shearing force F were to be distributed along the entire width of the block then the strength of both of the panels 13 and 15 would come into play. If the shear direction should be such as shown by the arrow G (FIG. 3) the strength of the panels 13 and 15 would again come into play to resist collapse of the honeycomb cells by spreading and reducing local concentrations of force.

It may be remarked that a second wrapper may be wrapped at right angles around the block so as to provide additional panels covering the open end faces. However this increases the cost of manufacture, since each block would require an individual wrapping step, and the gain in strength is marginal.

Referring now more particularly to FIGS. 4 and 5, there is shown a low-cost method of manufacturing wrapped blocks from a wrapped plank of material forming an intermediate product from which the blocks may readily be cut. Thus in FIG. 4 numeral 31 indicates a folder for the reception of a strip of kraft paper 33 which enters the folder from a supply 35 by movement over a guide roll 37. The width of the strip 33 is equal to the perimeter of a right cross section of the block 1. Scoring wheels 39 associated with roll 37 apply score lines 21, 23, 25 and 27 as illustrated.

At numeral 41 is shown a plate which supports a compaction 43 of honeycomb material as it comes from the machine which makes it as shown, for example, in said patent. A gravity operated brake bar 45 having end guide means 47 functions to slow egress of the compaction 43 from the manufacturing machine. This forms the compaction 43. Then the honeycomb cells are made by pulling from the compaction and forming a band 49 of open cells. The width of the band 49 will automatically become less than the width of the compaction. This is more clearly shown in FIG. 5.

At numerals 51 are shown sidewise adhesive applicator shoes supplied with adhesive over lines 53. The spacing between the pads 51, as shown in FIG. 5, is such that the fins 5 angle back as adhesive is applied to their forward faces.

Next the band 49 enters between corrugated adhesive rolls 55. These operate in conjunction with so-called fountain type adhesive wells 57 to pick up adhesive and apply it to the upper and lower end edges of the honeycomb cells. The glue rolls are ridged similar to those of a screw thread in order to sufficiently apply adhesive to the honeycomb edges even though there may occur some unevenness in those edges. The relatively sharp threaded rolls level any unevenness in the honeycomb edges thus making this possible. A second purpose of these ridges is to draw off excessive adhesive through cohesion of adhesive and at the same time bringing the applied adhesive up so that it stands on the upper edges of the honeycomb. With adhesive thus applied, the band descends as shown by the arrow to a set of guiding discs 59 located at the open inlet end 20 of the folder 31. Thus the band becomes cradled within the infolding sides of the strip 33. The score lines 21, 23, 25 and 27 are located at the four longitudinal corners of the band 49. As the contiguous band 49 and the scored and folded strip pass through the folder 31 they become adhered and issue from the outlet end 61 of the folder 31 as shown at the lower left in FIG. 4. The issuing material is in the form of a plank 22 of honeycomb core around which the strip 33 is formed as a wrapper adhered thereto. Draw rolls 63 draw both the band 49 and strip 33 through the apparatus and deliver the plank in a continuous indefinitely long length. The plank 22 is then transversely segmented by sawing, cutting or the like to form blocks such as illustrated in FIGS. 1—3.

Figure 6:
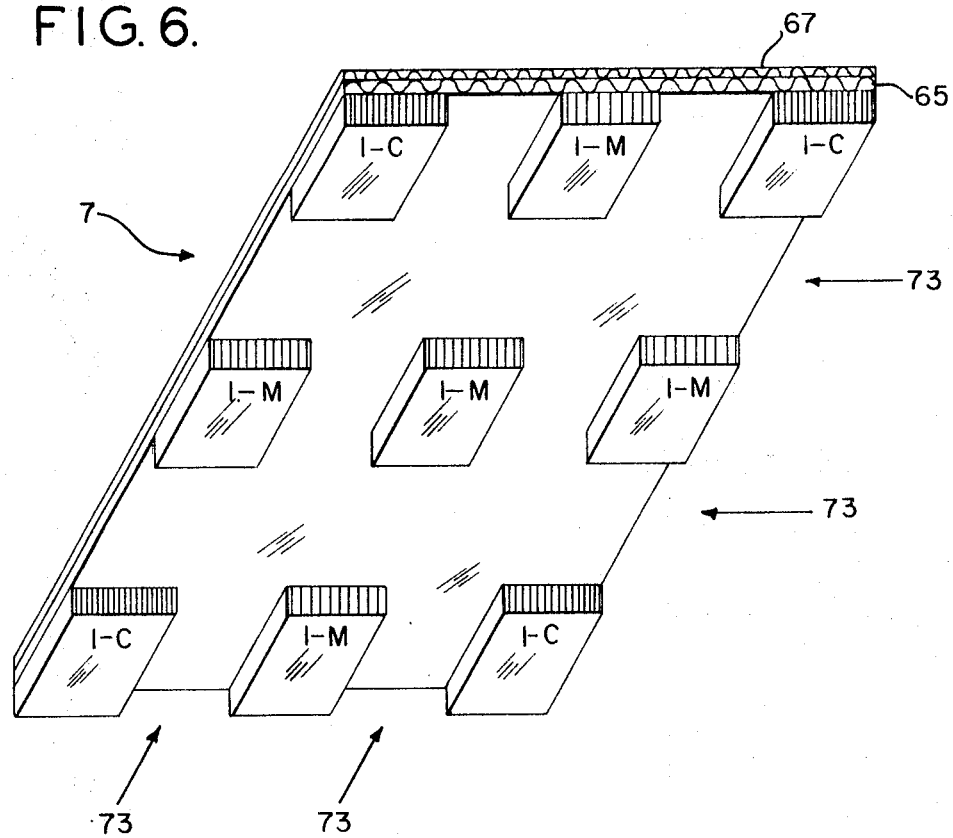
FIG. 6 is a trimetric bottom view of a cellular pallet board to which supporting blocks have been adhered according to the invention.
Figure 7:
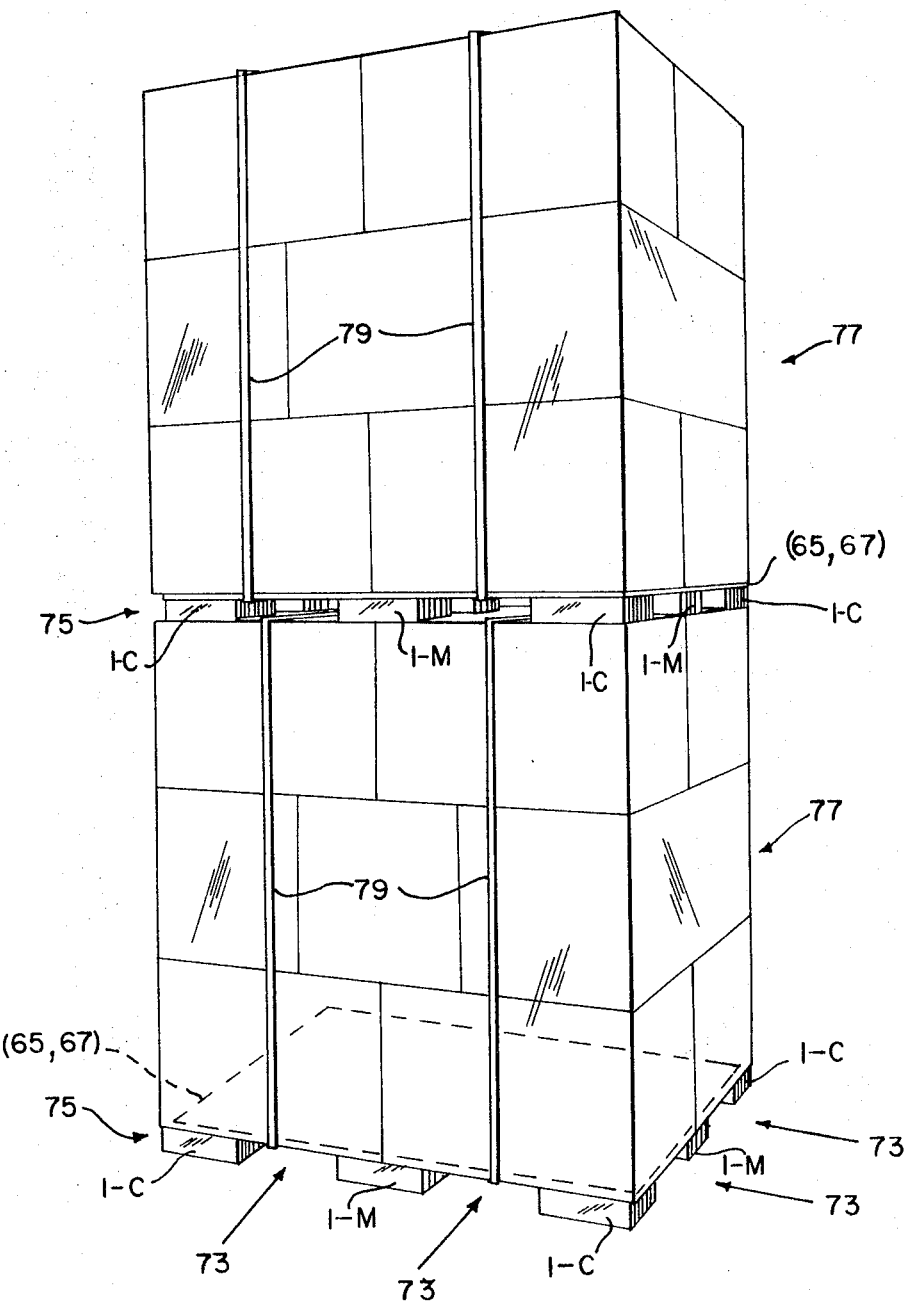
FIG. 7 is a trimetric view illustrating how the pallet board of FIG. 6 is used.

A use of blocks such as 1 made according to the invention is illustrated in FIGS. 6 and 7, which illustrate a new, strong, load-supporting pallet of very light weight. This comprises a platen of corrugated board preferably composed of two layers 65 and 67 which are interfacially adhered. Preferably one of these is made with coarse corrugations and the other with finer corrugations, the latter being on top. Attached to the bottom by means of adhesive applied to panels 17, 19 are blocks such as 1. A preferable number of blocks is nine, as illustrated. Four of these blocks are located at the corners of the board 65, 67 and are lettered 1–C. These blocks 1–C incorporate higher density small hexagonal honeycomb core cells which are stronger than comparatively lower density of blocks 1–M. The remaining five blocks lettered 1–M are disposed along crossing ranks and files of the same with one block 1–M midway between each pair of corner blocks 1–C on a side of the board 65, 67 and one block 1–M+at the center of board 65, 67. The blocks 1–M are composed of lower density honeycomb core cells and thus are not as strong as the blocks 1–C, for purposes which will appear. The disposition of the flat blocks as described leaves spaces such as indicated by the arrows 73 for the reception of the power lifting forks when the platen (numbered 75 as a whole) rests on the floor or on another surface. All of the blocks are flat as shown for maximum stability. FIG. 7 illustrates how stacked packaged loads 77 are supported by platens. Numeral 79 indicates holding bands around the loads and around the boards, These are not always used.

Sometimes a platen may be overloaded. If so, the first blocks to crush under compression would be the weaker ones lettered 1–M. The stronger corner blocks 1–C assure that any tilt in the load occurs toward the center, instead of away from the center and possibly onto the floor in the absence of any bands such as 79. Any crushed condition of the blocks 1–M indicates to a user that the platen has been overloaded and corrections can be made on a substituted pallet. In any event a catastrophic spillage such as in a supermarket would not by this time have occurred. It is contemplated that the pallets being light and of low cost may be used as portable shelving to be delivered in loaded condition to reception or other areas in such markets and, if desired, thrown away after removal of their loads.

While the above described form of the blocks is preferred because of the extremely low-cost, continuous manner of manufacture as in FIGS. 4 and 5, other wrapped forms may be employed such as illustrated in FIGS. 8—11. In FIG. 8, the margins 81 of the wrapper 83 are lapped and adhesively joined, instead of being abutted as in FIG. 1. This form may be made up from a plank essentially as illustrated in FIGS. 4 and 5. In FIG. 9 the wrapper is made in two parts, i.e., a scored and folded part 85 and an adhered covering strip part 87. The margins 89 of the part 85 are spaced apart. This form may also be made essentially as in FIGS. 4 and 5 by feeding a strip into the folder above the band 49 with suitable application of adhesive. FIG. 10 illustrates a form in which there are two wrapper parts 91 and 93 each of which is double scored, each being folded and wrapped around three faces of the cellular core. The folded panels of the members 91 and 93 which are overlapped on the sides of the core are adhesively attached to one another and to the ribs of the core. In effect the wrapper parts 91 and 93 are of U-shape. In FIG. 11 wrapper members 95 and 97, also of U-shape, are employed but in this case the overlapped margins are on the upper and lower faces of the honeycomb core, being adhered to one another and the core.

Appropriate dimensions (without limitations) are as follows: For the corrugated board 65, 67 appropriate dimensions are 40×48 inches with a thickness of 0.330 inch. The appropriate size of each of the nine supporting blocks for such a board is 7×8½×2 inches. The appropriate thickness for the kraft paper forming the honeycomb core is 0.008 inch. Because of the manner in which the honeycomb material is made the sides of its hexagons such as 99 which extend crosswise of the length of the honeycomb band are composed of two plies of the material 3 joined by adhesive (see said patent). This two-ply condition applies also to the fins 5, these being also composed of two plies joined by adhesive. The total thickness of each fin is thus, for example, 0.016 inch. As a result the bracing effects of the multiply fins which are adhered to the side panels such as 13 and 15 (FIGS. 1 and 2) is considerable. An appropriate thickness of the wrapper material is 0.013 inch.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A structural product comprising a honeycomb cellular core of prismatic form having honeycomb cells which are open ended on opposite faces of the core, a wrapper surrounding and adhered to said core around four sides thereof, said wrapper being formed by at least one flexible sheet folded along four corners of the prismatic core and adhered on two opposite inner faces to end edges of said open-ended honeycomb cells and adhered on the two remaining opposite inner faces to side portions of said honeycomb cells.

2. A structural product made according to claim 1 wherein said honeycomb core has sidewise fins which are angled and adhered over substantial areas to said two remaining inner faces of the wrapper.

3. A structural block according to claim 2 wherein said fins are of adhered multiply construction.

4. A structural block comprising a cellular honeycomb core of flatwise prismatic form having a depth less than its length and width, the axes of the honeycomb cells extending depthwise, said cells having marginally disposed fins extending parallel to said axes and a wrapper surrounding four sides of the core and adhered on two opposite sides of the block to endwise edges of the cells and on the other two opposite sides to said fins.

5. A structural block according to claim 4 wherein the wrapper is scored at its folds in registration with the four corners of the prismatic core.

6. A structural block according to claim 2 wherein the wrapper consists of a single sheet of material folded around four sides of the core.

7. A structural block according to claim 2 wherein the wrapper comprises one sheet of material folded around three sides of the core and parts of the fourth side, and a strip covering said fourth side.

8. A structural block made according to claim 2 wherein said wrapper consists of two U-shaped strips, folded over three sides of the core with marginal portions of the strips overlapping each other on two sides of the core.

9. A pallet for supporting loads, comprising a board, a number of supports for the board, each support comprising a prismatic core of honeycomb cellular material, a wrapper extending around and adhered to four sides of the core, each support being adhered to one side of the board, four of the supports being located at corners of the board, the remainder of supports being distributed in oppositely directed ranks across the board and between said corner supports.

10. A pallet according to claim 9 wherein the honeycomb cellular core material of the corner supports is stronger than that in the remaining supports.

11. A pallet made according to claim 10 wherein the supports are each of flatwise form, the axes of the cells of said honeycomb cellular material extending perpendicularly to the flatwise direction of said form, the honeycombs in the corner supports being more dense in structural form than the remainder of the supports whereby said corner supports are stronger.

12. A pallet according to claim 11 wherein said board is composed of at least one corrugated board.

13. A pallet according to claim 12 wherein said board is composed of multiply corrugated boards.

PO-1050
(5/69)

UNITED STATES PATENT OFFICE
CERTIFICATE OF CORRECTION

Patent No. 3,587,479      Dated June 28, 1971

Inventor(s) Robert C. Geschwender

It is certified that error appears in the above-identified patent and that said Letters Patent are hereby corrected as shown below:

On title page, line 22 of the Abstract, insert as a separate paragraph: "The finished product when in the form of blocks is useful for the production of a novel form of strong, lightweight pallets for support and transport of packaged loads, the blocks being adhered to the underside of a cellular pallet board. The arrangement allows the introduction of lifting forks under the board and between the blocks. Four of the blocks of the corners of the board incorporate cellular material of more dense structure for greater strength at the corners. Thus if perchance a load should become too great on a pallet, any resulting buckling will occur in a direction to cant the load inwardly so as to avoid spilling." Column 3, line 13, "1-M+at" should read --- 1-M at ---.

Signed and sealed this 28th day of December 1971.

(SEAL)
Attest:

EDWARD M. FLETCHER, JR.        ROBERT GOTTSCHALK
Attesting Officer              Acting Commissioner of Patents